United States Patent [19]

Rogers

[11] 4,268,757
[45] May 19, 1981

[54] WATER WHEEL ELECTRIC GENERATION DEVICE

[76] Inventor: Edward R. Rogers, 69 Prescott Ave., Chelsea, Mass. 02150

[21] Appl. No.: 94,960

[22] Filed: Nov. 16, 1979

[51] Int. Cl.³ .............................................. F03B 13/12
[52] U.S. Cl. ........................................ 290/53; 417/334
[58] Field of Search ........................ 416/9, 142 B, 86; 417/336, 334; 290/53

[56] References Cited

U.S. PATENT DOCUMENTS

| | | | |
|---|---|---|---|
| 1,067,064 | 7/1912 | Ripson | 416/142 |
| 1,112,352 | 5/1913 | Booth | 417/334 |
| 1,241,297 | 7/1914 | Stauber | 417/334 |
| 1,488,387 | 3/1924 | Gordon | 416/88 |

*Primary Examiner*—J. V. Truhe
*Assistant Examiner*—Donald Rebsch

[57] ABSTRACT

An improved water powered electric generating device which comprises a buoyant platform and a plurality of pylons fixedly mounted in the ocean or riverbed and which slidingly engages the buoyant platform, and a tower means fixedly mounted to the buoyant platform and upwardly extending therefrom. Axle means are rotatable about an axis and pivotedly adapted to the tower means and include means to rotate the axle means in an arc of substantially 120°, connected on one end to the tower means and on the other end to the axle means. The axle means and a plurality of radially and outwardly directed paddle arms are fixedly mounted to the first gear means and formed at the outward end thereof into a paddle to engage the moving water and rotate the first gear means. Pinion gear means toothedly engage the first gear means and are rotated thereby, and generator means are adapted to the pinion gear means and activated thereby to produce electricity.

3 Claims, 2 Drawing Figures

WATER WHEEL ELECTRIC GENERATION DEVICE

BACKGROUND OF THE INVENTION

The so-called "energy crisis" has directed inventors to consider use of means to generate electricity by harnessing the sun, wind and tidal ebb and flow. Of particular interest in the present invention is the use of the aforementioned tidal ebb and flow for the production of useful electric power. Various devices are known but are not wholly satisfactory for a variety of reasons.

For example, U.S. Pat. No. 3,959,663 teaches a complicated device for generating electric power by utilizing a platform which rises and falls, with high tide rising and developing a certain potential energy which is converted to kinetic energy as the platform falls to the low tide level, by the incorporation of a pendulum mechanism. This device generates energy only twice a day as there are only two tidal changes in a 24-hour period.

U.S. Pat. No. 3,604,942 teaches a rotor turbine device suitable to be positioned in a river current and rotated, thereby generating electricity.

There exists then a need for a water powered electric generating device which is simple to operate, stable while in use, and inexpensive while simple in construction. In addition this device should have relatively few parts and overcome the disadvantages of prior devices.

SUMMARY OF THE INVENTION

My invention relates to an improved water power electric generating device. I have discovered an improved water power electric generating device which comprises a buoyant platform and a plurality of pylons fixedly mounted in the ocean or river-bed and which slidingly engages the buoyant platform, and a tower means fixedly mounted to the buoyant platform and upwardly extending therefrom. Axle means are rotatable about an axis and pivotedly adapted to the tower means and include means to rotate the axle means in an arc of substantially 120°, connected to one end to the tower means and on the other end to the axle means. The axle means and a plurality of radially and outwardly directed paddle arms are fixedly mounted to the first gear means and formed at the outward end thereof into a paddle to engage the moving water and rotate the first gear means. Pinion gear means toothedly engage the first gear means and are rotated thereby, and generator means are adapted to the pinion gear means and activated thereby to produce electricity.

Preferably and optionally my water power electric generating device pivots in an upwardly directed arc from one position substantially 120° to a second position.

My invention provides numerous advantages over those devices found in the prior art. It is an advantage of my invention to utilize not only the flow but also the ebb tide to generate electricity.

Further advantages of my invention are that it is secure and stable while in use and is strong and durable, simple to manufacture, efficient, and economical in the generation of electric power.

DETAILED DESCRIPTION OF THE DRAWINGS

Figure 1:
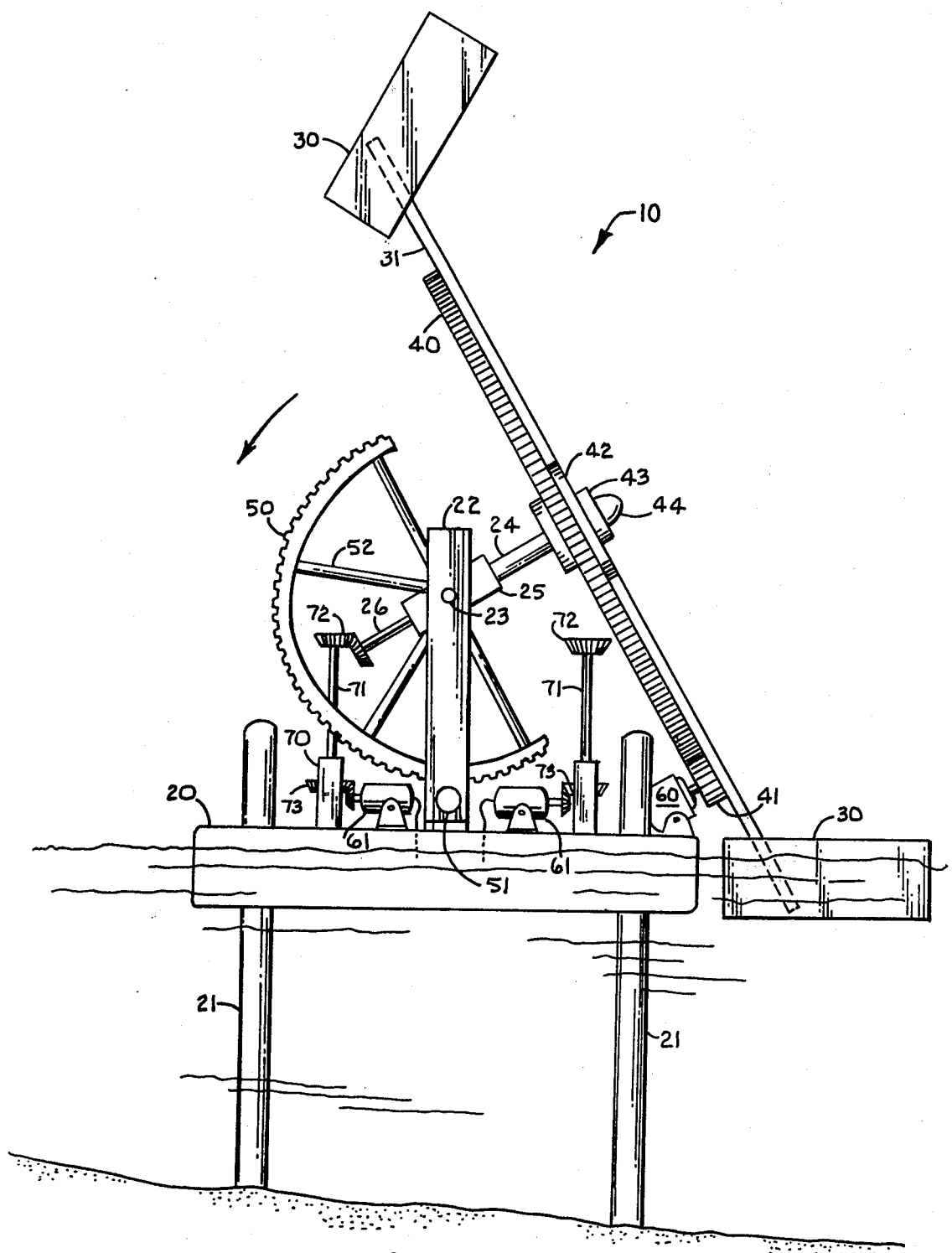
FIG. 1 is a perspective, illustrative side view of the device.

Referring now in particular to the accompanying drawings, my water powered electric generating device is generally indicated in FIG. 1 at 10, and includes buoyant platform 20, slidingly engaging a multiplicity of pylons 21. The rise and fall of the buoyant platform on said pylons is dictated by the change of tide from high to low and vice versa. A tower member 22, having pivot 23, supported therethrough is fixedly mounted on said buoyant platform. Rotor shaft 24 extends substantially upwardly from rotor shaft housing 25, and rotor shaft extension 26, extends substantially downwardly from said rotor shaft housing.

Bull gear 40 is mounted onto the rotor shaft and affixed thereto by collar 43 and nut 44. A plurality of arms 31, extend outwardly from the center of said bull gear, each of which has at one end thereof a paddle means 30, and at the other end attaches to the arm support 42.

Figure 2:
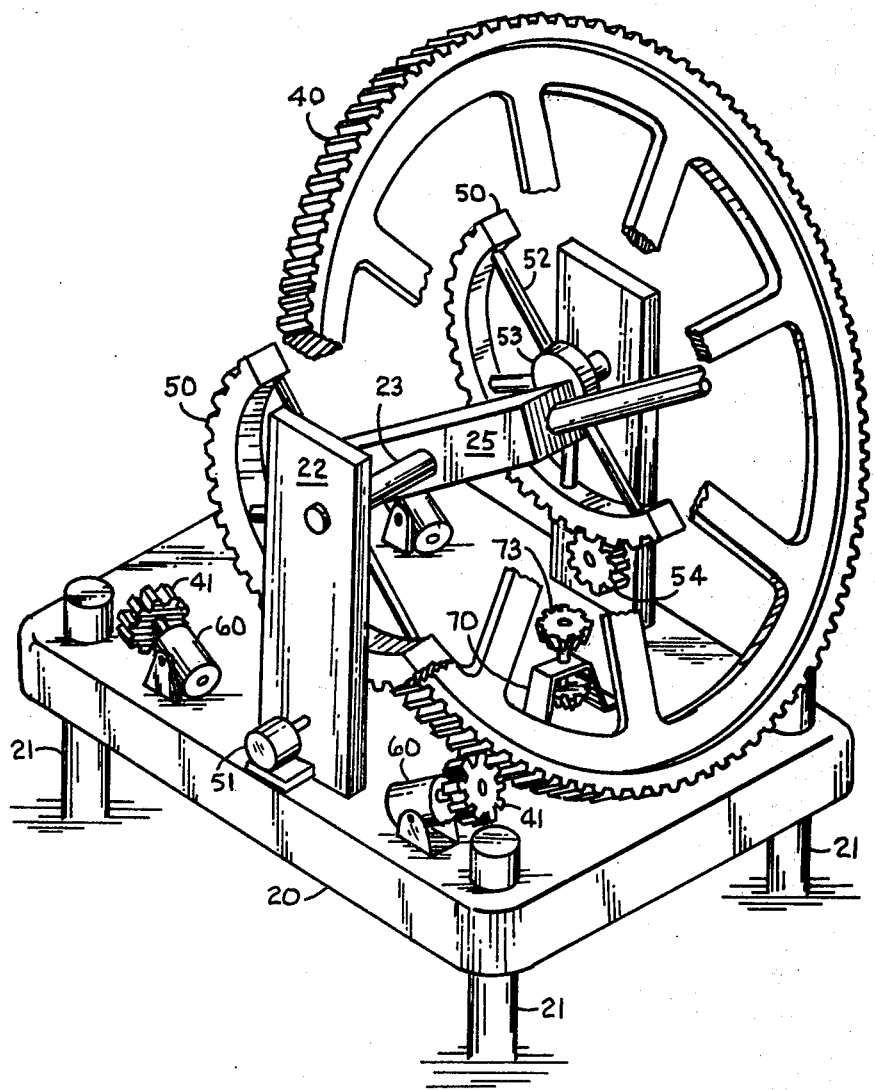
FIG. 2 is a detailed perspective view of the power wheel means.

Pinion 41 toothedly engages said bull gear at one end thereof and at the other end thereof engages generator 60. A second pinion and generator are located at the other end of the substantially 120° arc (see FIG. 2) so that the bull gear may engage said pinions to generate electricity both at ebb and flow tides.

Gear segment 50, supported by gear support 52, and attached to gear drive 51, revolves the bull gear in the substantially 120° arc to engage the other pinion/generator means to generate electricity upon the changing tide or to let navigation pass the water power electric generating device system.

Further electric power is obtained from the cooperation of upper bull gear 72, supported by extension 71, and support 70, and lower bull gear 73, which adapt to center generators 61 to produce more electricity. This beveled gear system is duplicated at the other end of the substantially 120° arc of the bull gear.

Typically when the water powered electric generator device is in use the paddle means contact the water surface and are driven by the flow of the tide or the current in the river in one direction which rotates the bull gear which in turn rotates the pinions at a rapid rate, generating electricity. At the change of tides the power wheel means is rotated 120° and catches the tidal flow in the opposite direction, turning the bull gear and once again generating electricity. On a river, the bull gear can be rotated 120° to allow passage of boats. As illustrated and described, my water power electric generating device has numerous advantages over the present devices used for generating electricity from the tidal and river flows.

What I claim is:

1. A water power electric generating device comprising:
   (a) a buoyant platform
   (b) a plurality of pylons, fixedly mounted in the ocean or river-bed, slidingly engaging said buoyant platform;
   (c) tower means fixedly mounted to said buoyant platform and upwardly extending therefrom;
   (d) axle means rotatable about an axis and pivotedly adapted to said tower means;
   (e) means to rotate said axle means in an arc of substantially 120° connecting on one end to said tower means and on the other end to said axle means;

(f) first gear means fixedly mounted to said axle means;

(g) a plurality of radially and outwardly directed paddle arms fixedly mounted to said first gear means and formed at the outward end thereof into a paddle to engage the moving water and rotate said first gear means;

(h) pinion gear means toothedly engaging said first gear means and rotated thereby;

(i) generator means adapted to said pinion gear means and activated thereby to produce electricity.

2. The water power electric generating device of claim 1, wherein said axle means further comprise:

(a) axle housing means disposed about said axle means;

(b) shaft means disposed through said axle housing means substantially perpendicularly to said axle means transfixing said tower means and adapted thereto to allow pivoting of said first gear means in an arc substantially 120°.

3. The water power electric generating device of claim 2, wherein said means to rotate said axle means further comprise:

(a) a gear segment means fixedly mounted to said shaft means and moveable between a first position substantially 120° to a second position;

(b) gear segment drive means engaging said gear segment means and when activated moves said gear segment means between said first and said second positions.

* * * * *